3,332,782
GELATIN PRODUCT
Winston H. Wingerd, Elgin, Ill., assignor to The Borden Company, New York, N.Y., a corporation of New Jersey
No Drawing. Filed May 22, 1964, Ser. No. 369,592
6 Claims. (Cl. 99—130)

This invention relates to gelatin which will be instantly soluble in cold water.

Gelatins now used as gelling agents must first be placed into solution by the use of hot water and then cooled to permit gelatin. This is inconvenient, time consuming and required because present gelatins are insoluble in cold water. Attempts have been made to form cold water soluble gelatins involving the use of various diluents or special processing steps. None, however, have been completely satisfactory and the compositions formed, while cold water soluble, contain limited concentrations, 15% to 25%, of gelatin. The present procedures are not successful in preparing cold-water soluble gelatin at a concentration of 50% gelatin or higher.

It has now been found possible to prepare gelatins having a gelatin concentration of 50% or higher that are instantly soluble in cold water.

Briefly stated, the present invention comprises a cold water soluble gelatin formed by reacting a gelatin with an undenatured protein selected from the group consisting of lactalbumin and lactalbumin phosphate, and to the process of making such product.

As used herein, the term "cold water soluble" means gelatin soluble in water from 1° to 10° C. or at the temperature of cold tap water as used in the home. The gelatin which can be used in the present invention may be in solid or in solution form, it being evident as set forth later herein that the solid gelatin can be dissolved in water by heating to place it into solution to prepare products of the instant invention. Gelatin of any desired Bloom may be employed. If the gelatin is of 175 Bloom or lower it is possible to obtain cold water soluble gelatin compositions containing as high as 80% gelatin. With gelatins of 200 Bloom and higher the gelatin concentration of the final product should not exceed 60%.

The protein used must be undenatured lactalbumin or lactalbumin phosphate. The lactalbumin phosphate used is preferably one of in which the phosphate is a polyphosphate having a $P_2O_5$ content of 65% or greater; examples being Graham's salt and combinations of sodium metaphosphate and potassium polymetaphosphate.

In preparing the gelatins of the present invention it is important that the mixture of protein and gelatin be heated for a time and at a temperature sufficient to denature the protein. In general, the process comprises forming a solution of gelatin, adding the protein (lactalbumin or lactalbumin phosphate) and heating at 180° to 190° F. for about 30 minutes to denature the protein and react it with the gelatin, and drying. It is important that the lactalbuim or lactalbumin phosphate be added to the gelatin solution and heat denatured in the gelatin solution. Dependent upon the gelatin concentration desired in the end product, the gelatin concentration in the solution can be varied. For best processing results the solids content of the solution should be about 20 parts by weight when denaturation is to take place although the solids content may range from about 5 parts to about 30 parts.

If it is desired to further facilitate the dispersion of the gelatin in cold water, the dried gelatin-lactalbumin powder can be mixed with from about 1 to about 5% of an acetylated monoglyceride; preferably about 2%. This mixture gives an even more satisfactory dispersion and solution of the gelatin, particularly when premixed with other dry ingrediaents such as sugar and milk solids in making instant pudding and other gelatin desserts.

The acetylated monoglycerides are derived fats which are made by acetylating hydrogenated animal and vegetable fats and oils. The fatty acid moieties are identical with those in hydrogenated animal and vegetable fats and oils and correspond to a distilled monoglyceride in which approximately two-thirds of the free hydroxyl groups have been acetylated. Moreover, the term "acetylated monoglyceride" as used herein is meant to include both the single acetylated monoglyceride and the mixture of different monoglycerides that have been acetylated as would be present when acetylating hydrogenated lard or cottonseed oil, among others.

It will be evident that other materials such as flavorings, can be added to the gelatin solution, dependent upon the use to be made of the gelatin. Thus for example if it is to be used for a home dessert, such as "Jello," various fruit flavorings, and sweeting agents, such as sugar can be added.

The invention will be described further in connection with the specific examples set forth below which are for purposes of illustration only. In the examples, and elsewhere herein, proportions are expressed as parts by weight unless specifically stated to the contrary.

Example 1

20 parts of cold water were placed in a jacketed kettle equipped with agitators and heating means. 5 parts of 175 Bloom gelatin was added to the water and the mass agitated to uniformly hydrate the gelatin. 10 parts of hot water (170° to 180° F.) were added to the kettle and the temperature of the gelatin solution adjusted to 140° F. with steam in the kettle jacket.

5 parts of undenatured lactalbumin were then placed in the kettle and the entire mixture agitated. When the lactalbumin was uniformly dispersed the mixture was heated to 160° F. followed by addition of 10 parts of water at 265° F. to raise the temperature to 180°–185° F. Agitation was now stopped and the mixture held at 180°–190° F. for 30 minutes to denature the lactalbumin and react it with gelatin. The product was then spray dried to a moisture content of about 3%.

The resultant product was soluble in cold tap water.

Example 2

The materials and procedures of Example 1 were used, except that the lactalbumin was replaced by lactalbumin phosphate.

Example 3

The materials and procedures of Example 1 are used, and the resultant dried powder was mixed with 2 parts of an acetylated monoglyceride (MYVACET 7–00), based on the weight of the dried powder.

The mixture is readily dispersible in cold water.

In all instances the gelatins prepared according to this invention were rapidly dispersible and soluble in water as cold as 1° C.

It will be understood that it is intended to cover all changes and modifications of the examples of the invention herein chosen for the purpose of illustration which do not constitute departures from the spirit and scope of the invention.

What is claimed is:

1. A cold water soluble gelatin compositon comprising the reaction product of gelatin and a protein selected from the group consisting of undenatured lactalbumin and lactalbumin phosphate.

2. A dry, cold water soluble gelatin composition comprising the reaction product of gelatin and at least a substantially equal proportion by weight of a protein selected from the group consisting of undenatured lactalbumin and lactalbumin phosphate.

3. The dry, cold water soluble gelatin composition of claim 2 including an acetylated monoglyceride.

4. The method of making a cold water soluble gelatin composition comprising the step of heating an aqueous mixture of gelatin and at least a substantially equal proportion by weight of a protein selected from the group consisting of undenatured lactalbumin and lactalbumin phosphate for a time and at a temperature sufficient to denature the protein and react it with the gelatin.

5. The method of making a cold water soluble gelatin composition comprising the steps of heating an aqueous mixture of gelatin and at least a substantially equal proportion by weight of a protein selected from the group consisting of undenatured lactalbumin and lactalbumin phosphate for about 30 minutes at a temperature within the range of about 180° F. to about 190° F., and drying the mixture; the solids content of the aqueous mixture being within the range of from about 5 to about 30 parts by weight.

6. The method of making a cold water soluble gelatin composition comprising the steps of forming an aqueous mixture containing 20 parts by weight of gelatin and at least about 20 parts by weight of a protein selected from the group consisting of undenatured lactalbumin and lactalbumin phosphate, heating the mixture for 30 minutes at a temperature within the range of about 180° F. to about 190° F., and spray drying the mixture.

References Cited

UNITED STATES PATENTS 2,738,275   3/1956   Block _____ 99—19

A. LOUIS MONACELL, *Primary Examiner.*

J. M. HUNTER, *Assistant Examiner.*